(12) United States Patent
Jones et al.

(10) Patent No.: US 6,870,931 B2
(45) Date of Patent: Mar. 22, 2005

(54) METHOD AND SYSTEM FOR EMBEDDING MESSAGE DATA IN A DIGITAL IMAGE SEQUENCE

(75) Inventors: Paul W. Jones, Churchville, NY (US); Chris W. Honsinger, Ontario, NY (US); Majid Rabbani, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 793 days.

(21) Appl. No.: 09/735,783

(22) Filed: Dec. 13, 2000

(65) Prior Publication Data

US 2002/0094082 A1 Jul. 18, 2002

(51) Int. Cl.$^7$ ................................................ H04N 7/167
(52) U.S. Cl. ...................................... 380/219; 713/176
(58) Field of Search .............................. 380/216, 200, 380/201, 217, 219; 713/176

(56) References Cited

U.S. PATENT DOCUMENTS

| 5,809,139 A | 9/1998 | Girod et al. |
| 5,835,639 A | 11/1998 | Honsinger et al. |
| 5,901,178 A | 5/1999 | Lee et al. |
| 5,991,426 A | 11/1999 | Cox et al. |
| 6,026,193 A | 2/2000 | Rhoads |
| 6,044,156 A | 3/2000 | Honsinger et al. |
| 6,567,532 B1 * | 5/2003 | Honsinger ............... 382/100 |
| 6,678,389 B1 * | 1/2004 | Sun et al. ............... 382/100 |
| 6,678,390 B1 * | 1/2004 | Honsinger ............... 382/100 |

OTHER PUBLICATIONS

Depovere et al., "The VIVA Project: Digital Watermarking for Broadcast Monitoring", *International Conference On Image Processing*, 1999, pp. 202–205.

Echizen et al., "General Quality Maintenance Module For Motion Picture Watermarking", *IEEE Transactions On Consumer Electronics*, IEEE Inc., New York, US, vol. 45, No. 4, Nov. 1999, pp. 1150–1158.

Nikolaidis, et al., "Robust Image Watermarking In The Spatial Domain", *Signal Processing. European Journal Devoted To The Methods and Applications Of Signal Processing*, Elsevier Science Publishers B. V. Amsterdam, NL, vol. 66, No. 3, May 28, 1998, pp. 385–403.

Delannay et al., "Generalized 2–D Cyclic Patterns For Secret Watermark Generation", *IEEE Signal Processing Society International Conference On Image Processing*, vol. 2, Sep. 10, 2000, pp. 77–79.

* cited by examiner

*Primary Examiner*—Kim Vu
*Assistant Examiner*—Linh L D Son
(74) *Attorney, Agent, or Firm*—Peyton C. Watkins (57) ABSTRACT

A method for embedding message data in a digital image sequence having two or more frames, includes the steps of: providing a dispersed message image representative of the message data; and adding spatially shifted versions of the dispersed message image to successive frames of the digital image sequence.

16 Claims, 5 Drawing Sheets

METHOD AND SYSTEM FOR EMBEDDING MESSAGE DATA IN A DIGITAL IMAGE SEQUENCE

FIELD OF THE INVENTION

The invention relates generally to the field of digital image processing, and in particular to a method for embedding watermarks in digital image sequences.

BACKGROUND OF THE INVENTION

Digital watermarking refers to the embedding of a hidden message in an image or image sequence for such purposes as establishing ownership, tracking the origin of the data, preventing unauthorized copying, or conveying additional information (meta-data) about the content. Watermarking has potential uses in a wide range of products, including digital still and video cameras, printers and other hardcopy output devices, and content delivery services (e.g., Internet-based photofinishing). Recently, there has been significant interest in the electronic distribution and display of theatrical movies, which is termed digital cinema. Studios and distributors have a strong need to protect the movie content from unauthorized use, and watermarking can assist by establishing ownership and tracing the source of stolen content (through the use of hidden date/time/location stamps inserted at the time of the movie distribution and/or presentation). The present invention relates specifically to the watermarking of image sequences, and thus it has usefulness in an application such as digital cinema.

Numerous watermarking methods have been described in the prior art, including both patents and the technical literature. Many of these methods are described in review papers such as: Hartung and Kutter, Multimedia Watermarking Techniques," Proc. IEEE, 87(7), pp. 1079–1107 (1999), and Wolfgang et al., Perceptual Watermarks for Digital Images and Video, Proc. IEEE, 87(7), pp. 1108–1126 (1999).

A basic distinction between various methods is whether the watermark is applied in the spatial domain or the frequency domain. In either approach, it is common for a pseudo-random (PN) sequence to be used in the watermark generation and extraction processes. The PN sequence serves as a carrier signal, which is modulated by the original message data, resulting in dispersed message data (i.e. the watermark) that is distributed across a number of pixels in the image. A secret key (i.e. seed value) is commonly used in generating the PN sequence, and knowledge of the key is required to extract the watermark and the associated original message data.

As noted in the review papers by Hartung et al. and by Wolfgang et al., most research on watermarking techniques has focused on single-frame images, and there are significantly fewer methods that are specific to image sequences (i.e. video watermarking). Of course, a watermarking method that has been designed for single-frame images could be applied to an image sequence by merely repeating the same process for each frame. However, this approach has the disadvantage that the fixed watermark pattern may become perceptually objectionable when the image sequence is displayed in real-time.

There are several prior art patents that include video-specific watermarking methods: U.S. Pat. No. 5,809,139 issued Sep. 15, 1998 to Girod et al. entitled Watermarking Method and Apparatus for Compressed Digital Video; U.S. Pat. No. 5,901,178 issued May 4, 1999 to Lee et al. entitled Post-Compression Hidden Data Transport for Video; U.S. Pat. No. 5,991,426, issued Nov. 23, 1999 to Cox et al. entitled Field-Based Watermark Insertion and Detection; U.S. Pat. No. 6,026,193 issued Feb. 15, 2000 to Rhoads entitled Video Steganography.

In the patents by Girod et al. and Lee et al., the methods are designed for directly embedding a watermark in compressed frequency-domain video streams (such as MPEG-encoded sequences). The patent by Cox et al. describes a method for alternately embedding positive and negative watermarks in consecutive fields of an interlaced video signal; this method is not suitable for progressively scanned image sequences such as those used in digital cinema applications. The patent by Rhoads discloses the basic concept of using multiple watermarked frames from an image sequence to extract the watermark with a higher degree of confidence than would be obtained with only a single frame. However, the methods described in all of the aforementioned patents make use of the same watermarking pattern in each successive frame of the sequence. As a result, these methods are subject to the same disadvantage as previously mentioned, namely, the presence of a fixed watermark pattern that can be objectionable.

There are obvious modifications that can eliminate the fixed watermark pattern, but they also suffer from limitations. One modification is to change the PN carrier from frame to frame, but this may necessitate a brute-force search of all possible carriers when performing the watermark extraction process. The management of the secret keys that are used in generating the PN sequences also becomes problematic. Another modification is to change the message while using the same carrier, but it may not be desirable to change the message from frame to frame in many applications. Moreover, either modification does not allow information from multiple frames to be directly combined when extracting the watermark. This limitation reduces the robustness of the watermark extraction process to certain types of removal attacks.

There is a need therefore to have an image sequence watermarking technique that: (1) minimizes the visibility of the watermark when the watermarked sequence is displayed in real-time, (2) requires only a single key for the generation and extraction of the watermark data, and (3) allows for information from multiple frames to be combined when extracting the watermark.

SUMMARY OF THE INVENTION

The need is met according to the present invention by providing a method for embedding message data in a digital image sequence having two or more frames, that includes the steps of: providing a dispersed message image representative of the message data; and combining spatially shifted versions of the dispersed message image with successive frames of the digital image sequence.

ADVANTAGES

The present invention minimizes the visibility of a watermark in an image sequence while simultaneously providing the convenience of a single-key system. The invention also allows watermark information to be combined from multiple frames, which improves the robustness of the watermark extraction process.

DETAILED DESCRIPTION OF THE INVENTION

The present invention overcomes the limitations of the prior art by using a single carrier image (and hence provides the convenience of a single key) to generate a dispersed message image, but the dispersed message image is spatially shifted from frame to frame. The shifting may be done using either a deterministic or random offset between frames. The shifting process minimizes the visibility of a watermark by preventing spatial alignment of the watermark pattern from frame to frame. The shifting does not substantially degrade the robustness of the watermark extraction process when it is applied to a single frame, because the shifting acts in a similar manner as cropping of the image. Most watermark techniques are designed to be robust to cropping since it is a common image processing operation. Moreover, because the same carrier image is used for each frame, the extraction process can easily combine information from multiple frames (after suitable alignment) to provide more robust extraction of the watermark. The present invention is aimed primarily at watermark methods that embed in the spatial domain. However, it can also be applied to some frequency domain methods that use local frequency decompositions, e.g., block-based transformations.

The present invention is preferably implemented by a programmed digital computer. The computer can be a general purpose digital computer or a special purpose computer for digital image processing. It is within the ordinary skill in the programming art to provide a computer program for practicing the present invention from the following description of the invention.

Figure 1:
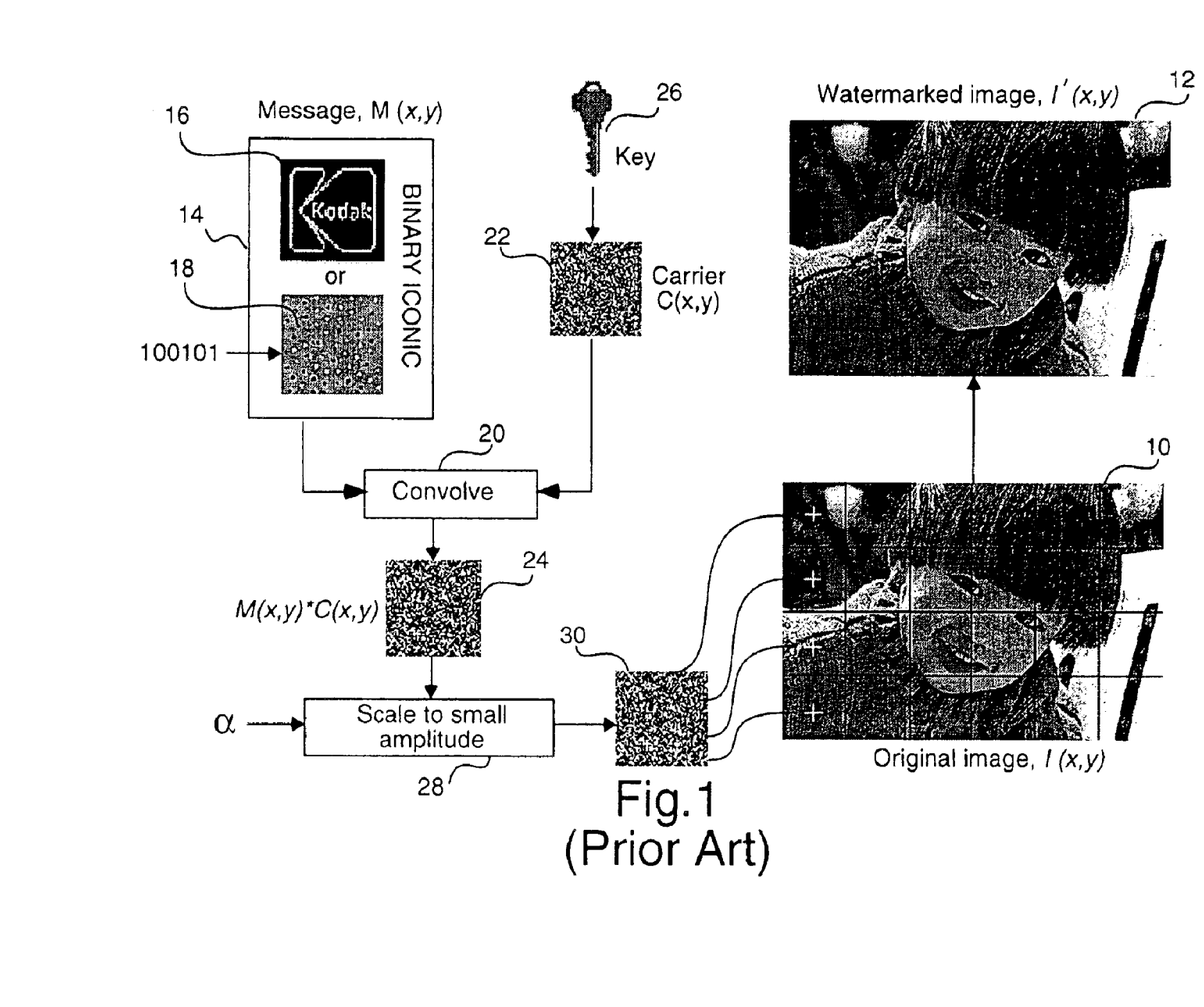
FIG. 1 is a schematic diagram illustrating a prior art method for embedding a watermark in an original image.

A preferred data embedding technique for use with the present invention is disclosed in U.S. Pat. No. 6,044,156 issued Mar. 28, 2000 to Honsinger et al. entitled Method for Generating an Improved Carrier for Use in an Image Data Embedding Application. This patent is included in its entirety by reference. Referring to FIG. 1, in this technique, an original two-dimensional image 10, I(x, y), is processed to produce a watermarked image 12, I'(x, y). A two-dimensional message 14, M(x, y), represents the data to be embedded in the original image 10. In its most general form, the message 14 is an image, and it can represent an icon 16 (e.g. a trademark), or it can represent the bits 18 in a binary message. In the latter case, the on and off states of the bits are represented as plus and minus ones (more specifically, positive and negative delta functions), which are placed in predefined and unique locations across the message image. Examples of iconic message data are trademarks, corporate logos or other arbitrary images. Performance generally decreases as the message energy increases so edge maps of the icons are used. Examples of binary message data are 32-bit representations of URL's, and copyright ID codes, or authentication information.

As shown in FIG. 1, the fundamental steps for embedding message data in an original image with this method are:
1. A n×n message image 14, M(x, y), is generated from the message data;
2. The message image 14 is circularly convolved 20 with a n×n carrier image 22, C(x, y), to produce a n×n dispersed message image 24. The carrier image may be produced using a secure key 26 as is known in the prior art;
3. The dispersed message image 24 is scaled 28 in amplitude using a multiplicative factor α; and
4. The scaled dispersed message image 30 is added to the original image 10 as contiguous n×n tiles to form a watermarked image 12, I'(x, y).

The tiling of the dispersed message image forms the watermark pattern that is combined with the original image. The scaling factor α is an arbitrary constant chosen to make the watermark pattern simultaneously invisible and robust to common processing. Typically, the size of the dispersed message image 24 is chosen to be smaller than the size of original image 10, and the tiling process allows the scaled dispersed message 30 to be repetitively embedded over the extent of the original image 10. The repetitive structure provides robustness to the watermark when image processing operations (such as cropping, compression, lowpass filtering, etc.) are applied to the watermarked image. Other watermarking techniques use different methods for embedding the message data, but the repetitive nature of the embedding process is a common aspect because of this improved robustness.

This embedding process for each tile can be described mathematically as:

$$I'(x,y)=\alpha[M(x,y)*C(x,y)]+I(x,y), \quad (1)$$

where the symbol * represents circular convolution. From Fourier theory, spatial convolution is equivalent in the frequency domain to adding phase while multiplying magnitudes. Therefore, the effect of convolving the message image 14 with the carrier image 22 is to distribute the message energy in accordance with the phase of the carrier image and to modulate the amplitude spectrum of the message image with the amplitude spectrum of the carrier image. If the message image were a single delta function, δ(x, y), and the carrier image had random phase and substantially flat Fourier magnitude, the effect of convolving with the carrier image would be to distribute the delta function over space. Similarly, the effect of convolving a message image with a random phase carrier image is to spatially disperse the message energy.

Figure 2:
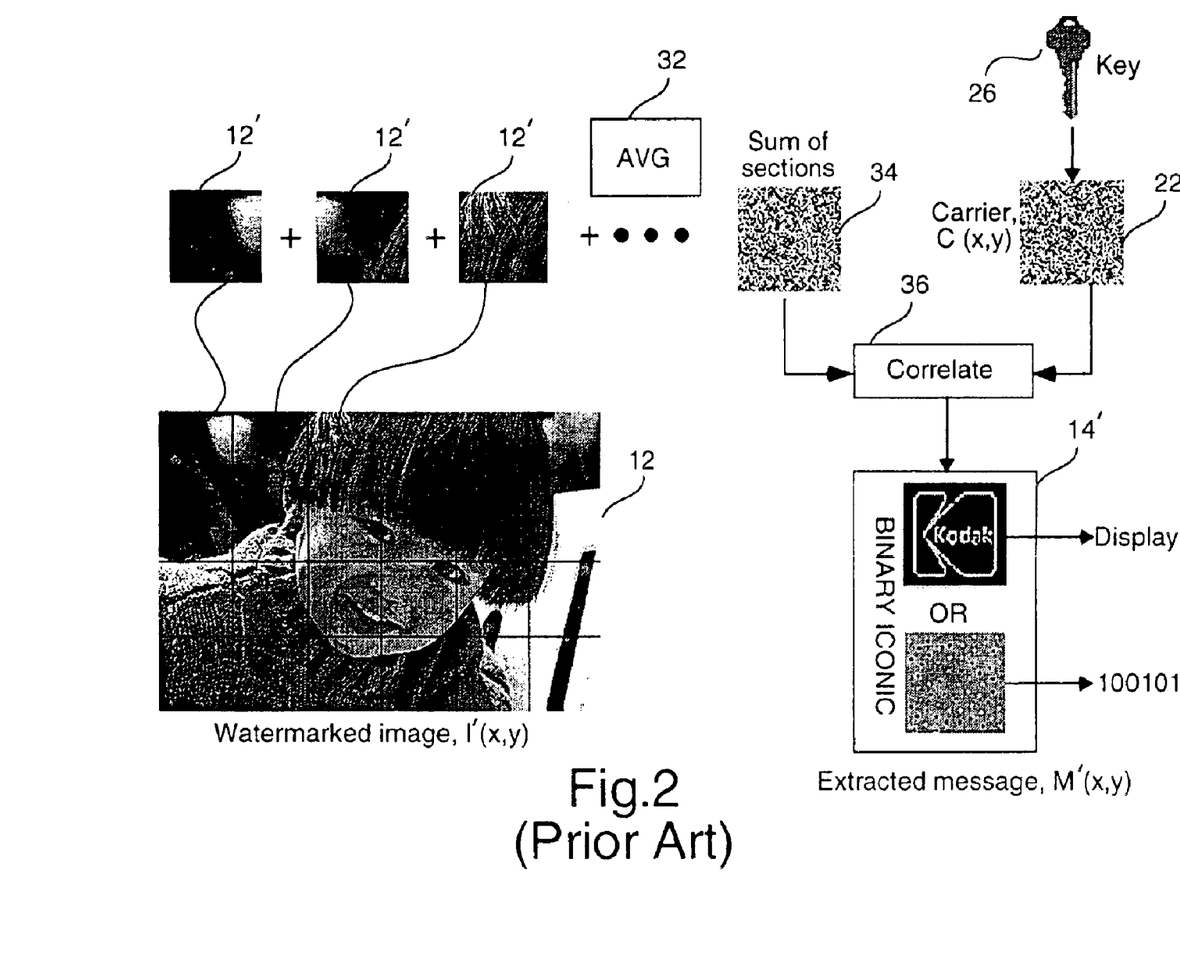
FIG. 2 is a schematic diagram illustrating a prior art method for extracting a watermark from an image containing an embedded watermark.

As shown in FIG. 2, the process as described by Honsinger et al. for extracting the message data from a watermarked image consists of the following fundamental steps:
1. Contiguous n×n tiles 12' are formed from the watermarked image 12, I'(x, y);
2. The tiles 12' are averaged 32 across each spatial location (x, y) to form an averaged tile 34;
3. The averaged tile 34 is circularly correlated 36 with the n×n carrier image 22, C(x,y), to produce an extracted n×n message image 14', M'(x,y); and
4. The message data is recovered from the extracted message image 14'.

The averaging 32 of the individual tiles 12' produces a better estimate of the message data (i.e., it improves the signal-to-noise ratio) because the dispersed message image in each tile will add constructively (since it is the same in each tile), while the corresponding original image content in each tile will add destructively (since it is typically different in each tile).

This watermark extraction process can be described mathematically as:

$$M'(x, y) = I'(x, y) \otimes C(x, y) \quad (2)$$
$$= \alpha[M(x, y) * C(x, y)] \otimes C(x, y) + I(x, y) \otimes C(x, y)$$

where the symbol, $\otimes$, represents circular correlation. Correlation is similar to convolution in that Fourier magnitudes also multiply. In correlation, however, phase subtracts. Therefore, the phase of the carrier image subtracts when the watermarked image is correlated with the carrier image, thus leaving the message image. Indeed, if we again assume that the carrier image is designed to have a substantially flat Fourier amplitude, then the process of correlation of the carrier image on the watermarked image Eq. 2, can be reduced to:

$$M'(x,y) = \alpha M(x,y) + \text{noise}. \quad (3)$$

That is, the extracted message image is a scaled version of the original message image plus noise due to the cross correlation of the original image with the carrier image.

More generally, we can rewrite Eq. 2 as:

$$M'(x,y) = \alpha M(x,y) * [C(x,y) \otimes C(x,y)] + \text{noise}. \quad (4)$$

The above equation suggests that the resolution of the extracted message image is fundamentally limited by the autocorrelation function of the carrier image, $C(x,y) \otimes C(x,y)$. Any broadening of $C(x,y) \otimes C(x,y)$ from a delta function will blur the extracted message image when compared to the original message image. Another way to view the effect of the carrier image on the extracted message image is to consider $C(x,y) \otimes C(x,y)$ as a point spread function, since convolution of the original message image with $C(x,y) \otimes C(x,y)$ largely determines the extracted message image.

In a typical application of this watermarking process, the tiling of the dispersed message image is performed using the same tile locations for each original image. Typically, the tiles would be arranged by starting with a full tile in the upper left corner of the image, and then placing additional tiles as needed to cover the original image. If the original image size is not an integer multiple of the tile size, there will be border regions that do not contain full tiles. These regions can be ignored during the extraction process.

Figure 3:
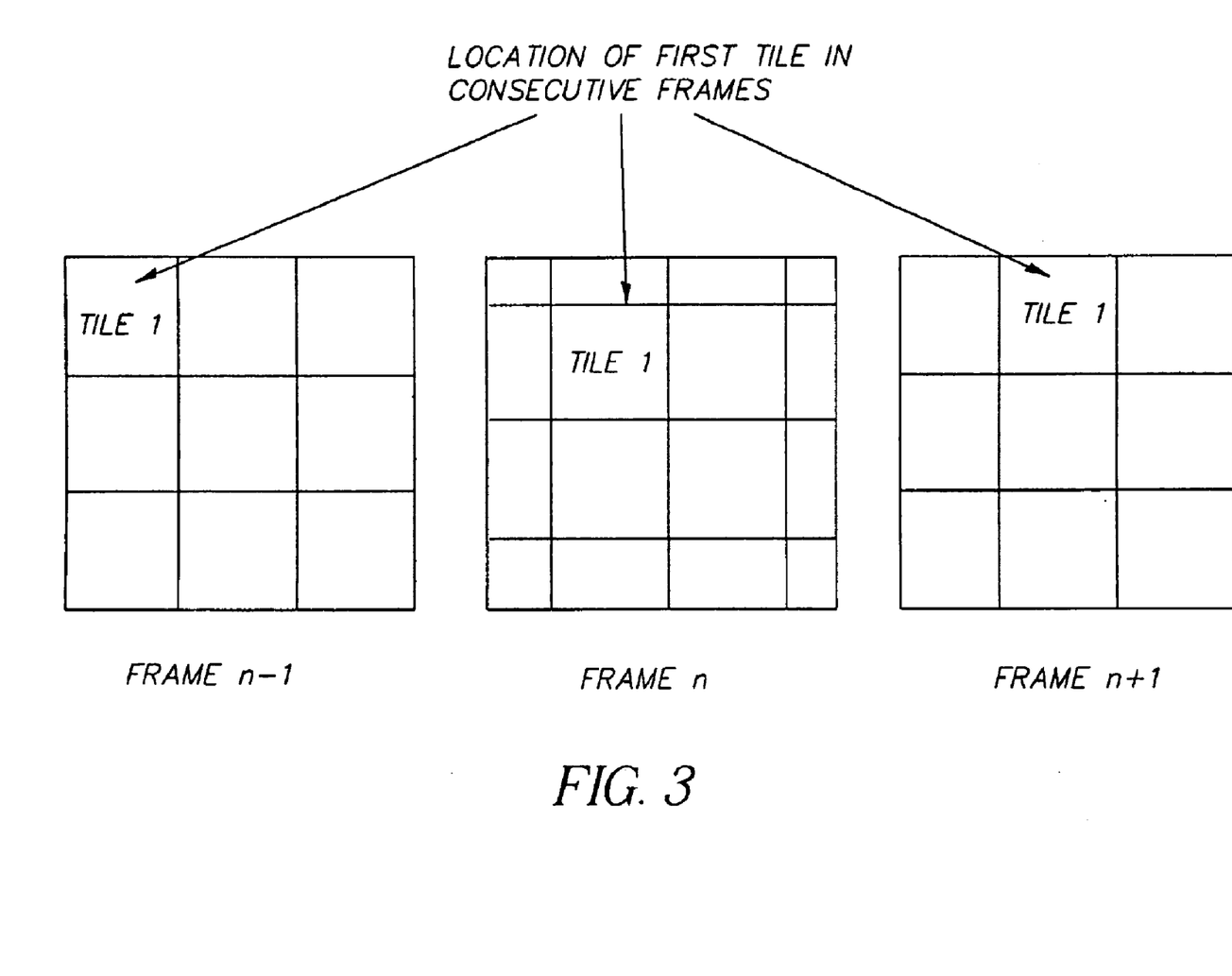
FIG. 3 is a schematic diagram illustrating the spatial shifting of the dispersed message image between frames in the present invention.

As described previously, the typical application of this watermarking process to an image sequence results in a fixed watermark pattern for each frame. This fixed pattern may be objectionable when the sequence is viewed. The present invention overcomes this limitation by spatially shifting the tile locations (and hence the watermark pattern) from frame to frame. While the tiles are still placed in a contiguous manner within a frame, the first tile in the frame is shifted by an integer number of pixels relative to the first tile in the previous frame. This process is shown in FIG. 3 for the three consecutive frames. The shifting process is cyclical, i.e., the tile pattern can be viewed as connected cylinders in the horizontal and vertical directions. In this way, the watermark pattern always covers the original image regardless of the amount of the shift.

Figure 4:
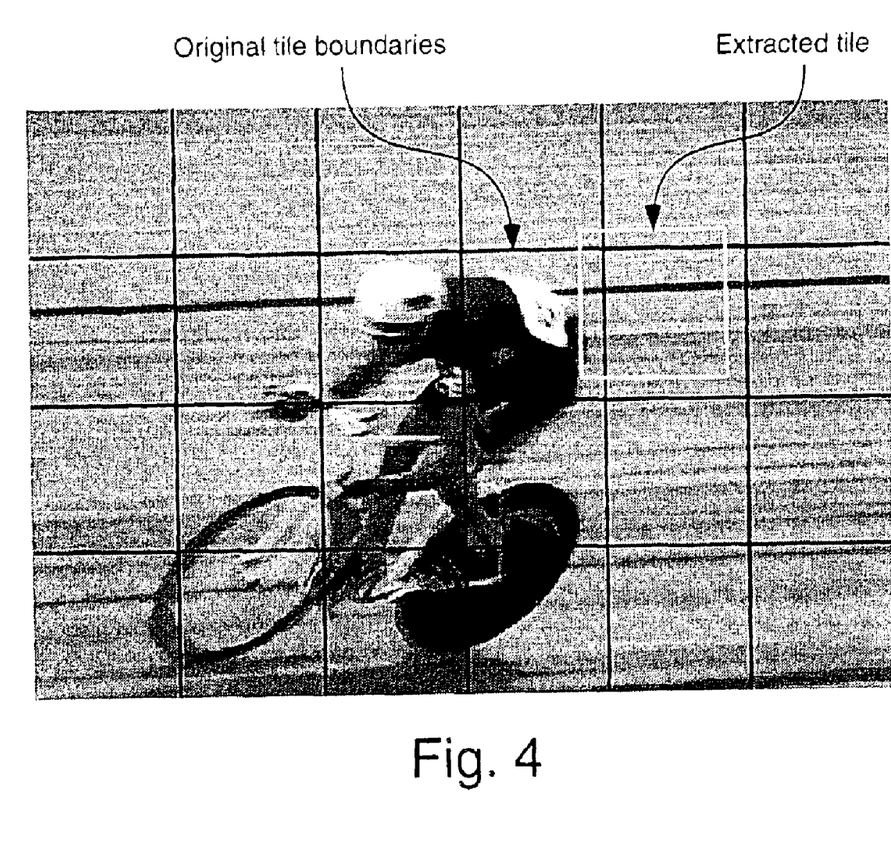
FIG. 4 is an example of the potential misalignment between embedded tiles and an extracted tile during the watermark extraction process.

For the present invention to work effectively, the extraction process must be able to recover the embedded message image even when the watermark pattern has been shifted from its nominal position. During extraction, n×n tiles are formed from the watermarked image, but there is no guarantee that these extracted tiles will be aligned with the original watermark tile boundaries. This situation is illustrated in FIG. 4. This is known as the synchronization problem, and it is the same problem that occurs when a watermarked image has been cropped by an unknown amount. In the following, we describe how the preferred embodiment can synchronize a watermark pattern that has been shifted by an unknown amount.

Figure 5:
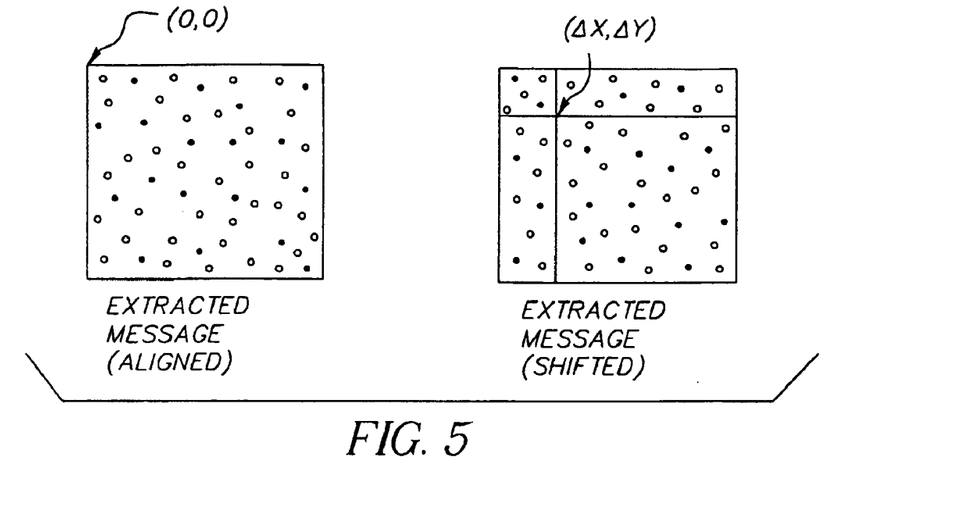
FIG. 5 illustrates the effect of tile misalignment on an extracted message.

The ability to recover from cropping is an essential component of a watermarking algorithm. In the preferred embodiment, if an arbitrarily located n×n region is extracted from a watermarked image, the extracted message image from this region would probably appear to be circularly shifted since it is unlikely that the extraction occurred along the original tile boundary. Indeed, if the origin of the n×n extracted region is a distance, $(\Delta x, \Delta y)$, from its nearest original tile boundary, then the extracted message image will be circularly shifted by $(\Delta x, \Delta y)$, i.e. $M'(x-\Delta x, y-\Delta y)$. This effect of this circular shift on the extracted message image is shown in FIG. 5.

On the surface, this circular shift ambiguity is a severe limitation on data capacity because it would appear that the message structure must be invariant to cyclic shifts. However, it is also possible to determine $(\Delta x, \Delta y)$ under certain conditions, and thus realign the extracted message image. As described in copending application, U.S. Ser. No. 09/453,160 filed Dec. 2, 1999 by Honsinger, this can be accomplished by placing the bits in the message image in a special manner. Specifically, a message template is used, which is a prescription of where to place the bits in the message image. The message template, $T(x,y)$, is derived by placing positive delta functions on a blank n×n image such that each delta function is located a minimum distance away from all others and such that the autocorrelation of the message image is as close as possible to a delta function. In other words, the bits are placed such that the message template autocorrelation sidelobes have minimal amplitude.

Now, correlation of the extracted tile with a zero mean carrier image guarantees that the circularly shifted extracted message image $M'(x-\Delta x, y-\Delta y)$ is also zero mean. As a result, the absolute value of the extracted message image must be practically equivalent to a circularly shifted message template. That is $$|M'(x-\Delta x, y-\Delta y)| = T(x,y) * \delta(x-\Delta x, y-\Delta y). \quad (5)$$

Figure 6:
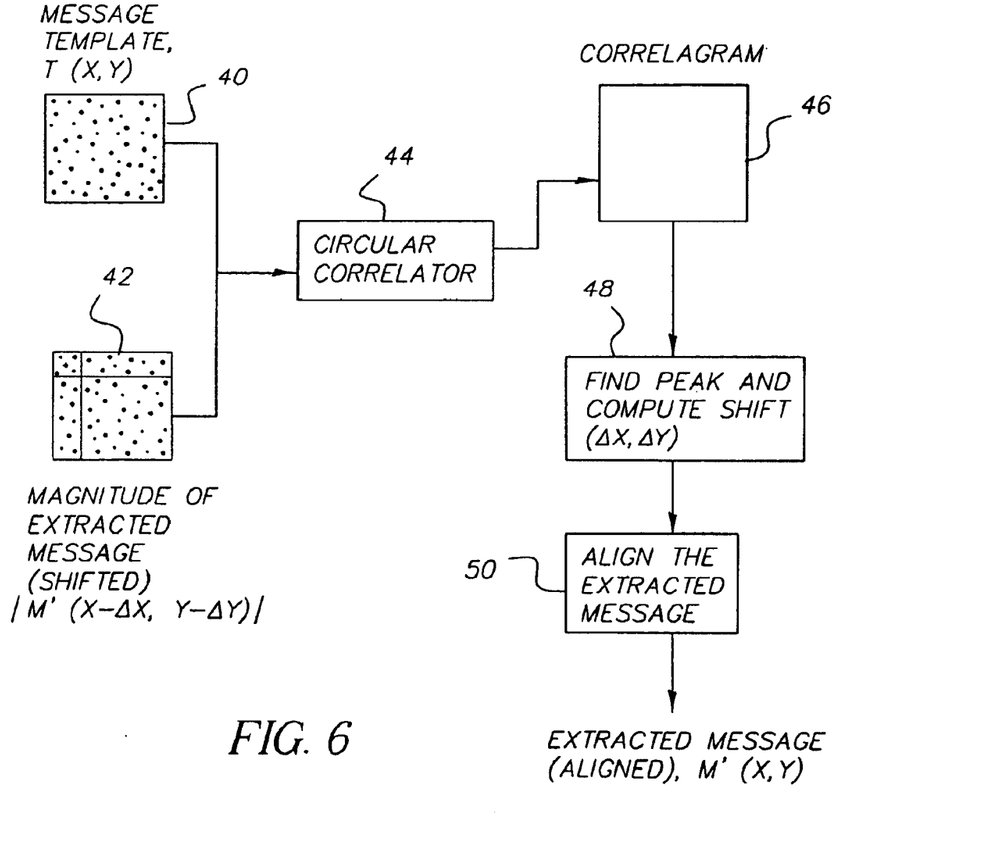
FIG. 6 is a block diagram of a method for determining the tile offset using a message template.

As shown in FIG. 6, due to the autocorrelation property of the message template, this implies that the shift from the origin of the message image can be derived by circularly correlating 44 $|M'(x-\Delta x, y-\Delta y)|$ 42 with $T(x,y)$ 40, since:

$$|M'(x-\Delta x, y-\Delta y)| \otimes T(x,y) = \delta(x-\Delta x, y-\Delta y). \quad (6)$$

Therefore, the result of the correlation will be a n×n correlagram image 46, whose highest peak will be located at the desired shift distance, $(\Delta x, \Delta y)$. This peak location can be found 48 and used to compute the shift $(\Delta x, \Delta y)$. The shift is then applied to align 50 the extracted message image, which allows for the correct interpretation of the embedded message bits.

In the present invention, the offset of the tiles between consecutive frames can be deterministic or random. A deterministic offset has the advantage that once the spatial shift is known for one frame, the spatial shift for the other frames can be easily computed. For a deterministic offset, one could use a state-transition table, where the x or y offset value in the current frame (i.e., the current state) is determined by the x or y offset value from the previous frame (i.e., the previous state). After a specified number of frames, the current state returns to the initial state. An even simpler method is to add a constant x or y offset to the previous x or y offset value. However, a random offset may help to further reduce the visibility of the watermark.

A random offset for each frame can be produced by a variety of different approaches. In general, we need to generate a pair of random numbers that can be mapped to a (x,y) pair of integer pixel displacements. This mapping can be a simple 1-to-1 mapping. One approach is to derive the random numbers from a PN sequence. For simplicity, the seed value (key) could be the same as that used in generating the carrier for the watermarking process, but a different key and/or a different random number generation process could also be used. Another approach is to use some unique attribute of each frame of the image sequence in the random number generation process. Such attributes include, but are not limited to, the frame number or a time stamp. By representing the attribute as a m-bit number, it can then be used as the seed value for the PN sequence generation. It is also possible to apply a hashing function directly to the m-bit value to derive a n-bit value (n<m), where the n-bit value is the integer pixel displacement. Different random number generators or different hashing functions can be used to derive the (x,y) offset pair from the same m-bit attribute value.

Since the same carrier image is used for each frame, the tiles from any number of frames can be combined after determining the offset of each frame. This improves the constructive addition of the dispersed message image. Moreover, the summation of the tiles from multiple frames will result in improved destruction of the original image content, because the content often varies significantly over a number of frames. Even if the original image content is static between frames, the different offsets of the tiles insures that different content is used in each frame. These properties increase the robustness of the watermark by increasing the signal-to-noise ratio of the extracted message image, which provides improved protection against certain removal attacks and/or allows for the amplitude of the watermark to be reduced to a lower level. Reducing the amplitude further reduces the visibility of the watermark.

In some applications of the present invention, it may be desirable to use the same spatial shift in several consecutive frames, rather than changing the spatial shift with each frame. This may provide additional robustness to the watermark extraction process when the image sequence data has been modified during certain types of attacks. For example, if a video camcorder is used to capture an illegal copy of a projected movie in a theater, there is a mismatch of the temporal sampling rates of the projected image (24 progressive frames per second) and the video camcorder (60 interlaced fields per second). If the offsets are changed with each frame, there will be occasions when the camcorder will integrate different watermark patterns over two frames. By allowing the same watermark pattern to persist for two frames, there is an increased probability that the watermark can be extracted from any field or interlaced frame of the illegal video copy. Of course, increasing the display duration of a watermark pattern with the same offset beyond two frames might further increase the robustness of the extraction process, but the slowly changing watermark pattern will also be more easily perceived than one that is changing every frame or every other frame.

It is worthwhile to note that the circular shifting of the tile pattern is entirely equivalent to circularly shifting either the carrier image or the message image in the preferred embodiment. This is a result of the circular convolution that is used when creating the dispersed message image. For a given implementation of the present invention, it may be advantageous to perform the spatial shifting of the watermark pattern using either a circular shift of the tile pattern, a circular shift of the carrier image, or a circular shift of the message image.

Another benefit of the invention is that a variable offset between frames also provides the opportunity to embed additional information in the image sequence. By considering a sequence of offsets (or offset differences) associated with a group of consecutive frames, we can embed and then extract additional message data. This data could be related to the message data that is embedded in each individual frame, or it could be completely different information such as a time stamp associated with the group of frames. As an example, consider a simple scheme where we wish to embed N bits of information (a presentation time stamp, for example) over a group of N consecutive frames in the original sequence. We can then associate one bit with each frame by the following process. If the offset for a frame is less than a pre-specified threshold, the corresponding bit is a '0', and if the offset is greater than the threshold, the corresponding bit is a '1'. It is worth noting that this process of embedding information using the offset of the tiles can be also applied to an image sequence watermarking method that uses different keys or different message data for each frame. However, as described previously, these methods still suffer from limitations as compared to the present invention.

While the invention has been discussed in terms of the spatial domain watermarking process as described by Honsinger et al., it is obvious how the same method can be applied to any spatial domain watermarking process that allows the watermark pattern to be shifted during the embedding process and subsequently synchronized during the extraction process. The invention can also be used for some types of frequency domain watermarking methods. In particular, many frequency domain watermarking methods use block-based transforms such as the 8×8 DCT that is used in JPEG and MPEG compression systems. Some methods apply the watermark directly to the compressed bit stream (such as the method described by Girod et al.), and the present invention cannot be applied to these methods because the DCT block locations are fixed. However, other frequency domain methods use the DCT outside of a compression framework, and these methods can easily shift the DCT block locations from frame to frame.

For completeness, we note that correction for rotation, scaling (magnification), and skew is another fundamental element of all robust data embedding techniques. For shifted tiles to be synchronized properly, it may be necessary to first correct for rotation, scale, and skew. In Honsinger, et. al., U.S. Pat. No. 5,835,639, "Method for detecting rotation and magnification in images", a preferred method of correction of rotation and scale is described. The correction technique relies on autocorrelation of the watermarked image. For example, for a watermarked image that has not been rotated or scaled, we would expect to see autocorrelation peaks spaced horizontally and vertically at intervals of n pixels and n lines, where this spacing is related to the n×n tile structure of the dispersed message image. At the zero offset correlation point, there is a very high peak due to the image correlating with itself. Now, if the watermarked image is scaled, the peaks must scale proportionately. Similarly, if the watermarked image is rotated, the peaks must rotate by the same amount. Therefore, the rotation and scale of an image can be deduced by locating the autocorrelation peaks. Importantly, because autocorrelating the watermarked image requires no extra calibration signal, it does not tax the information capacity of the embedding system. In addition, this technique can be applied to any embedding technique with redundant embedded signals and may implemented on a local level to confront low order geometric warps.

Because the watermarking process as described by Honsinger et al. is robust to rotation, scale, and skew, it is possible for the watermark pattern to be rotated, scaled, or skewed from frame to frame, rather than shifted as is done in the present invention. These operations may also reduce the visibility of an embedded watermark in a sequence, but they are not preferred over shifting for several reasons. First, the local changes in the watermark pattern from frame to frame when using rotation, scale, or skew are not as substantial as those that can be obtained by shifting. For example, rotation can provide significant changes away from the center of rotation, but there will only be very small local changes around the center of rotation. Of course, these operations could be combined with shifting to produce even greater local changes than would be obtained using only one method. Second, the determination of rotation, scale, and skew when extracting the watermark is a more computationally intensive process than the determination of the shift. Likewise, changing the watermark pattern using scale, rotation, and skew during the embedding process requires more computations than simply shifting the tiles (or equivalently, shifting the carrier or message as described previously). Finally, the use of rotation, scale, and skew for changing the watermark pattern does not allow the information from multiple frames to be easily combined. With shifting, it is a simple matter of translating the tiles to a common origin, while the other methods require affine transformations that are more computationally demanding.

The invention has been described in detail with particular reference to certain preferred embodiments thereof, but it will be understood that variations and modifications can be effected within the spirit and scope of the invention.

PARTS LIST 10 two dimensional original image
12 watermarked image
12' contiguous tiles from watermarked image
14 two-dimensional message image
14' extracted message image
16 message icon
18 message bits
20 circular convolution image step
22 carrier image
24 dispersed message image
26 secure key
28 scale image step
30 scaled dispersed message image
32 average of individual tiles step
34 averaged tile
36 circular correlation step
40 message template T(x,y)
42 shifted extracted image $|M'(x-\Delta x, y-\Delta y)|$
44 circular correlation step
46 correlagram image
48 peak location step
50 aligning extracted message image step

What is claimed is:

1. A method for embedding message data in an image sequence having two or more frames, comprising the steps of:
   a) providing a dispersed message image representative of the message data;
   b) producing a cyclically shifted version of the dispersed message image corresponding to a spatial offset;
   c) combining the cyclically shifted version of the dispersed message image with a frame of the image sequence; and
   d) repeating steps b) and c) for one or more additional frames of the image sequence.

2. The method claimed in claim 1, wherein the step of producing a cyclically shifted version of the dispersed message image includes the steps of:
   a1) producing a message image representing the message data;
   a2) providing a carrier image;
   a3) convolving the message image with the carrier image to produce a dispersed message image; and
   a4) cyclically shifting the dispersed message image by a spatial offset to produce a cyclically shifted version of the dispersed message image.

3. The method claimed in claim 1, wherein the cyclically shifted dispersed message images are not visible when added to the frames of the image sequence.

4. The method claimed in claim 2, wherein the carrier image has random phase and substantially flat Fourier amplitude.

5. The method claimed in claim 1 wherein the cyclically shifted versions of the dispersed message image are shifted randomly for successive frames.

6. The method claimed in claim 1, further comprising the steps of:
   e) determining the spatial shift corresponding to each cyclically shifted version of the dispersed message image in a plurality of frames;
   f) aligning the plurality of frames based on the determined spatial shifts corresponding to the respective dispersed message images and combining the aligned frames to produce a combined frame; and
   g) extracting the message image from the combined frame.

7. The method claimed in claim 2, further comprising the steps of:
   e) determining the spatial shift corresponding to each cyclically shifted version of the dispersed message image in a plurality of frames;
   f) aligning the plurality of frames based on the determined spatial shifts corresponding to the respective dispersed message images and combining the aligned frames to produce a combined frame; and
   g) extracting the message image from the combined frame by correlating the carrier image with the combined frame.

8. A system for embedding message data in an image sequence having two or more frames, comprising:
   a) means for providing a dispersed message image representative of the message data;
   b) means for producing a cyclically shifted version of the dispersed message image corresponding to a spatial offset;
   c) means for combining the cyclically shifted version of the dispersed message image with a frame of the image sequence; and
   d) means for repeating initiating repetition of the means for producing and means for combining.

9. The system claimed in claim 8, wherein the means for producing a cyclically shifted version of the dispersed message data image includes:
   a1) means for producing a message image representing the message data;

a2) means for providing a carrier image;

a3) means for convolving the message image with the carrier image to produce the dispersed message image; and a4) means for cyclically shifting the dispersed message image by a spatial offset to produce a cyclically shifted version of the dispersed message image.

10. The system claimed in claim 8, wherein the cyclically shifted versions of the dispersed message image are not visible when added to the frames of the image sequence.

11. The system claimed in claim 9, wherein the carrier image has random phase and substantially flat Fourier amplitude.

12. The system claimed in claim 8 wherein the means for cyclically shifting the dispersed message image employs random spatial shifts.

13. The system claimed in claim 8, further comprises:

e) means for determining the spatial shift corresponding to each cyclically shifted version of the dispersed message image in a plurality of frames;

f) means for aligning the plurality of frames based on the determined shift applied spatial shifts corresponding to the respective dispersed message images and combining the aligned frames to produce a combined frame; and g) means for extracting the message image from the combined frame.

14. The system claimed in claim 9, further comprises:

e) means for determining the spatial shift corresponding to each cyclically shifted version of the dispersed message image in a plurality of frames;

f) means for aligning the plurality of frames based on the determined spatial shifts corresponding to the respective dispersed message images and combining the aligned frames to produce a combined frame; and g) means for extracting the message image from the combined frame by correlating the carrier image with the combined frame.

15. The method claimed in claim 1, wherein the step of producing a cyclically shifted version of the dispersed message image includes the steps of:

a1) producing a message image representing the message data;

a2) cyclically shifting the message image by a spatial offset to produce a cyclically shifted message image;

a3) providing a carrier image; and a4) convolving the cyclically shifted message image with the carrier image to produce a cyclically shifted version of the dispersed message image.

16. The method claimed in claim 1, wherein the step of producing a cyclically shifted version of the dispersed message image includes the steps of:

a1) producing a message image representing the message data;

a2) providing a carrier image;

a3) cyclically shifting the carrier image by a spatial offset to produce a cyclically shifted carrier image; and a4) convolving the message image with the cyclically shifted carrier image to produce a cyclically shifted version of the dispersed message image.

* * * * *